United States Patent [19]

Eskeli

[11] 3,834,179

[45] Sept. 10, 1974

[54] TURBINE WITH HEATING AND COOLING

[76] Inventor: Michael Eskeli, 6220 Orchid Ln., Dallas, Tex. 75230

[22] Filed: Oct. 23, 1973

[21] Appl. No.: 408,381

Related U.S. Application Data

[63] Continuation-in-part of Ser. No. 405,628, Oct. 11, 1973.

[52] U.S. Cl. .................... 62/401, 62/86, 415/178, 415/64, 60/327, 60/59 R
[51] Int. Cl. ............................................ F25b 3/00
[58] Field of Search ............ 415/64, 1, 178; 62/86, 62/401, 402, 499; 60/327, 59 R; 165/86

[56] References Cited
UNITED STATES PATENTS

| | | | |
|---|---|---|---|
| 2,393,338 | 1/1946 | Roebuck | 62/401 |
| 2,602,306 | 7/1952 | Japolsky | 62/401 |
| 3,748,057 | 7/1973 | Eskeli | 415/168 |
| 3,791,167 | 2/1974 | Eskeli | 62/401 |
| 3,793,848 | 2/1974 | Eskeli | 62/402 |

Primary Examiner—Henry F. Raduazo

[57] ABSTRACT

A method and apparatus for generating power by passing a fluid from higher energy level to a lower energy level by compressing said fluid within a centrifuge type first rotor, and discharging said fluid via nozzles near the periphery of said first rotor in a forward direction to a second rotor which is an inward flow type reaction turbine; and then passing said fluid near the center of said rotors back to said first rotor. Heat is being added to said fluid within said first rotor, and heat is being removed from said fluid within said second rotor. Said heat addition is from a heating fluid being circulated within a heat exchanger in said first rotor, and cooling is by a cooling fluid circulated within a heat exchanger in said second rotor. Said first fluid being circulated within said rotors is sealed therein, and is usually gaseous. Said heating and cooling fluids are from external sources and may be either liquids or gases.

5 Claims, 4 Drawing Figures

PATENTED SEP 10 1974  3,834,179
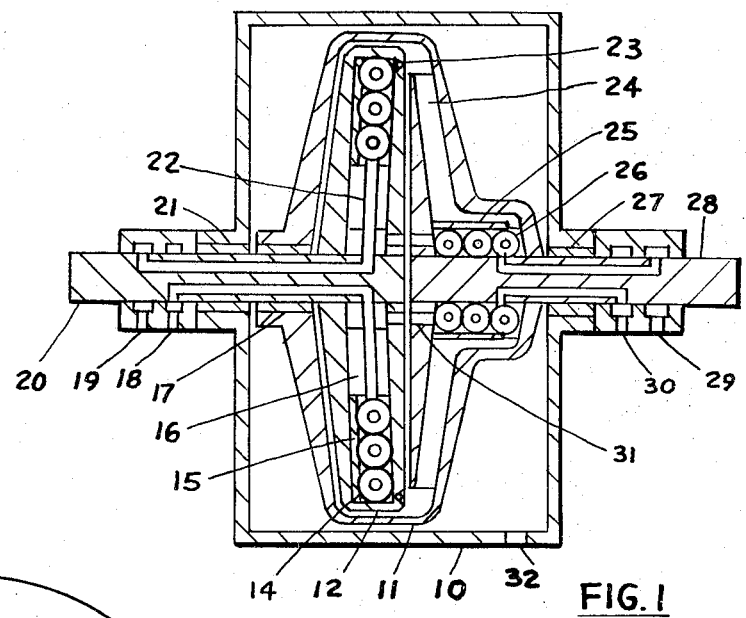
FIG.1
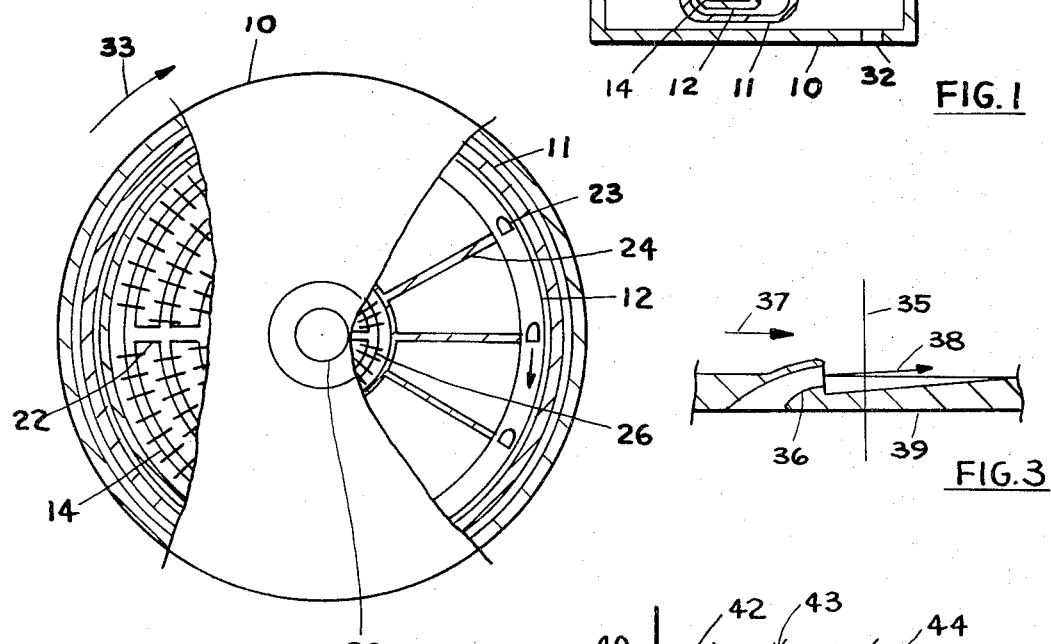
FIG.2
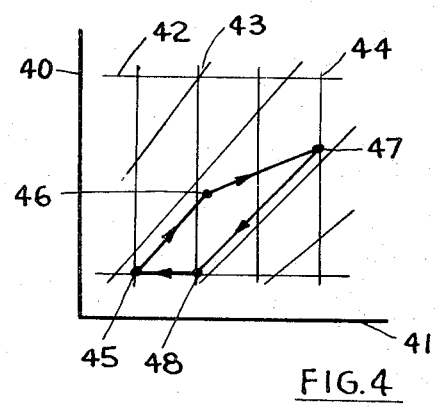
FIG.3
FIG.4

TURBINE WITH HEATING AND COOLING

CROSS REFERENCE TO RELATED APPLICATIONS

This application is a continuation-in-part application; the previous application was "Turbine with Dual Rotors," filed on Oct. 11, 1973, Ser. No. 405,628, by Michael Eskeli This invention relates generally to devices for generating power in response of a fluid being flowed from a higher energy level to a lower energy level by passing said fluid through a turbine for generating said power.

There have been various types of tubines previously, in some of which a fluid is accelerated in a single or multiple stationary nozzles and then passed to vanes mounted on a rotating rotor wheel, where the kinetic energy contained by said moving fluid is converted to power.

These conventional turbines normally have high energy losses due to fluid friction, especially between rotor vanes and the fluid where the velocity differentials are usually large. Also, these turbines often require complex shaped turbine vanes making the unit costly.

FIG. 1 is a cross section of the turbine, and FIG. 2 is an end view of the unit shown in FIG. 1.

FIG. 3 is a detail showing first rotor nozzles.

FIG. 4 is a pressure-enthalpy diagram showing the turbine cycle thereon.

It is an object of this invention to provide a turbine for generating power which is simple in construction, and which has a high efficiency in operation with low fluid velocities relative to rotor. Further, it is an object of this invention to provide a turbine wherein the first fluid is being circulated within said turbine unit, sealed therein, thus eliminating sealing problems associated with passing said first fluid in and out of said turbine rotor. Also, it is an object of this invention to provide a turbine unit which is so constructed as to allow its placement within a closed casing and operation of said unit with vacuum applied within said casing thus eliminating fluid friction on turbine external surfaces.

Referring to FIG. 1, therein is shown a cross section of the said turbine. Hereinafter, the first fluid will be the fluid being circulated within said turbine unit, the second fluid will be the fluid releasing heat, and the third fluid will be the fluid receiving heat. 10 is casing, 11 is second rotor, 12 is first rotor, 14 is heat exchanger within first rotor, 15 is support for heat exchanger 14, 16 is a vane within said first rotor, 17 is seal, 18 and 19 are second fluid inlet and outlet to unit, 20 is first rotor shaft, 21 is shaft bearing, 22 is second fluid distribution conduit, 23 are first rotor nozzles, 24 is second rotor vane, 25 is baffle to provide for proper circulation pattern for first fluid, 26 is heat exchanger wherein said third fluid is circulated passing from entry 29 along passage in shaft 28 to said heat exchanger 26 and back along shaft 28 to exit 30, 27 is second rotor shaft 28 bearing, 31 is first fluid passage from second rotor to first rotor, 32 is vacuum connection and vent for casing 10.

In FIG. 2, an end view of the turbine is shown, with portions removed to show interior details. 10 is casing, 11 is second rotor, 12 is first rotor, 23 are nozzles, 24 is second rotor vane, 12 is first rotor, 26 is second rotor heat exchanger, 28 is second rotor shaft, 14 is first rotor heat exchanger, 22 is second fluid distribution conduit, and 33 shows direction of rotation for both rotors.

In FIG. 3, a detail of said first rotor nozzles is shown. Said rotor rotates in direction indicated by 37, about an axis indicated by line 35. First fluid is discharged forward indicated by 38, through a nozzle 36 mounted on a rotor wall 39.

In FIG. 4, a typical pressure-enthalpy diagram for said first fluid is illustrated, with the turbine cycle superimposed thereon. 40 is pressure line and 41 is enthalpy line. 42 indicates constant pressure, 44 indicates constant enthalpy, and 43 indicates constant entropy. First fluid is compressed within said first rotor between points 45 and 47, and expanded between points 47 and 48. Usually, the first part of said compression is isentropic as indicated by line 45–46 and the with heat addition as indicated by line 46–47. The expansion is usually isentropic, as indicated by line 47–48, and then heat is added between points 48–45, where said first fluid again enters said first rotor. It should be noted that the pressure-enthalpy diagram cycle is approximate only, and may change depending on the actual shape and design of the two turbine rotors and the placement of the two heat exchangers; however, there always will be heating of the first fluid either during or after compression, and cooling of said first fluid at a lower pressure, with said cooling being either during expansion, after expansion, or during said compression.

In operation, the cavity within the two rotors is filled with a suitable first fluid. Said first rotor is rotated to cause said first fluid to be accelerated with accompanying compression within said first rotor with vanes 16 and heat exchanger fins assuring that said first fluid will rotate with said first rotor. During and after compression, heat is added to said first fluid from a second fluid being circulated in heat exchange relationship with said first fluid in a heat exchanger; after said heat addition, said first fluid is passed through a set of nozzles mounted near the periphery of said first rotor, said nozzles being oriented to pass said first fluid in forward direction thus increasing the absolute tangential velocity of said first fluid. After leaving said nozzles, said first fluid enters said second rotor first fluid passages; said passages are inward toward the center of said second rotor where said first fluid is delelerated with work associated with such deceleration being passed to said second rotor with vanes 24 assuring that said first fluid will rotate with said second rotor. After such deceleration and expansion of said first fluid, heat is removed from said first fluid in a heat exchanger wherein a third fluid is being circulated in heat exchange relationship with said first fluid. After such heat removal, said first fluid is passed to said first rotor via openings near the center of said two rotors.

In the process hereinbefore described, said first fluid is accelerated in said first rotor with addition of work, and with addition of heat; the addition of heat increasing the enthalpy of said fluid, and also, the first fluid pressure is increased. Part of the pressure and enthalpy increase is utilized to further increase the velocity of said first fluid in said nozzles. The second rotor will then rotate with a tangential tip velocity that is greater than the tangential velocity of said first rotor nozzles; said tangential tip velocity of said second rotor is usually the same as the absolute tangential velocity of said first fluid entering said second rotor inward fluid passages for best efficiency. To allow the return of said first fluid back to said first rotor after passing through said expansion within said second rotor, heat is removed from said first fluid to bring the temperature of said first fluid to a predetermined value suitable for conditions at first rotor center. Thus, in the turbine of this invention, said second fluid functions as the heat source, and said third fluid functions as the heat sink.

The turbine described herein is intended for high speed operation, and the construction shown on the drawings is suitable for such operations. The walls of the rotors are of heavy material sections to withstand the stresses due to high rotational speeds. The heat exchangers are to be of finned tubing construction, attached to support plates in turn supported by said rotor walls. Other types of heat exchangers may be used, such as building the passages for said second and third fluids in the rotor walls, and having said rotor vanes serve also as heat exchange members. Further, the said rotor vanes are shown to be radial; said vanes may be suitably curved, depending on the design of said rotors. In particular, the vanes within said second rotor may be curved in conventional manner, if the second rotor tip velocity is different from the entering tangential velocity of said first fluid. Further, the two rotors may have internal gearing within said casing, to transfer power from said second rotor to said first rotor needed to operate said first rotor, with remaining power output from said second rotor being passed to external load.

The fluids used with the turbine of this invention, are commonly available. Said first fluid is a gas, and may air, carbon dioxide, a halogenated hydrocarbon, or some other fluid. Said second fluid may be either a liquid or a gas, such as liquid ammonia, water, or other fluid. Said third fluid is usually a liquid, but a gaseous fluid may also be used.

Applications for this turbine include the usual power generator service for turbines. Also, this turbine can be used in power generation systems where the turbine can be operated at the same speeds as other equipment mounted on common shaft; this is particularly advantageous due to said first fluid being sealed within the turbine unit, while said heating fluid is circulated from said other equipment along the rotor shaft.

Various different arrangements for the heat exchangers within the rotors may be employed without departing from the spirit of this invention. For example, within the first rotor, cooling may be provided first for the first fluid near the rotor center, followed by said heating heat exchanger. Similarly, heating may be provided near the tip of said second rotor. These arrangements of the heat exchangers will have a minor effect on the shape of the cycle diagram as illustrated in FIG. 4, but the process is still the same, namely to heat the first fluid near the unit periphery, and to cool the first fluid near the unit center.

Various governors, gauges and the like are employed with the device of this invention. They do not form a part of this invention and are not further described herein.

In situations where said second fluid is a gas, there will be a temperature increase of said second fluid due to centrifugal compression. By selecting said second fluid such that the said temperature increase is greater for said second fluid than for said first fluid, heat can be added to said first fluid even when the entry temperature of said second fluid is the same or lower than the temperature of said first fluid at rotor center. Also, this means can be used to obtain additional heat transfer, when said second fluid is a gas, at a higher entry temperature than said first fluid at first rotor center.

What is claimed is:

1. A turbine for generating power and comprising:
   a. casing enclosing rotors therewithin and for supporting shafts for said rotors;
   b. shafts journalled in bearings in said casing for rotation;
   c. rotating first rotor mounted on a shaft so as to rotate in unison therewith, said first rotor being of circular configuration and adapted for high speed rotation, and having an entry port for a first fluid entrance near the center of said first rotor and having radially outwardly extending passageways for said first fluid with vanes therewithin for ensuring that said first fluid will rotate with said rotor for effecting acceleration and centrifugal compression of said first fluid; said radially extending passageways being provided with a heat exchanger for adding heat to said first fluid during and after compression; said radially extending passageways being provided with nozzles at their outward ends for passing said first fluid with said nozzles oriented to discharge said first fluid in forward tangential direction; said nozzles being shaped to obtain highest attainable exit velocity for said first fluid for the pressure differential available between entry and exit ends of said nozzles; said heat exchanger being supplied with a second fluid via passages within said first rotor shaft with said second fluid being distributed through fluid conduits to said heat exchanger and then said second fluid being returned via fluid conduits to said first rotor shaft passages for discharge; said second fluid being in heat exchange relationship with said first fluid when passing through said heat exchanger;
   d. a rotating second rotor mounted on a shaft so as to rotate in unison therewith, said second rotor being of circular configuration and adapted for high speed rotation; said second rotor having an entry for said first fluid adjacent to said first rotor nozzles for receiving said first fluid, with inward extending first fluid passageways having vanes therewithin to ensure that said first fluid therewithin rotates at the same rotational speed as the said rotor for receiving by said rotor the work associated with deceleration of said first fluid; said second rotor having a heat exchanger provided for cooling said first fluid with a third fluid being circulated within said cooling heat exchanger; said third fluid being in heat exchange relationship with said first fluid after expansion of said first fluid; said heat exchanger being provided with a supply of said third fluid via passages within said second rotor shaft, and said third fluid being discharged via passages within said second rotor shaft; said second rotor having exit port for said first fluid near the center of said second rotor for passing said first fluid to said first rotor.

2. The turbine of claim 1 wherein said turbine casing is provided with an aperture for evacuating a space between said rotors and said casing for reducing fluid friction on said rotors.

3. The turbine of claim 1 wherein said first fluid is a gas and said second fluid is a liquid, and said third fluid is a liquid.

4. The turbine of claim 1 wherein said first fluid is a gas and said second fluid is a gas.

5. A method of generating power in a turbine and comprising:
   a. sealing a first gaseous fluid within two rotating rotors, and compressing said fluid within a first rotor with addition of heat during and after compression;
   b. passing said first fluid via exit nozzles mounted on said first rotor periphery in forward direction thus increasing the absolute tangential velocity of said first fluid;
   c. passing said first fluid to a second rotor rotating at a greater rotational speed than said first rotor; said first fluid being decelerated within said second rotor with extraction of work; heat being removed from said first fluid after expansion within said second rotor and passing said first fluid into said first rotor.

* * * * *